April 22, 1958
J. A. CHASE ET AL
2,831,238
APPARATUS FOR AUTOMATICALLY MOUNTING SPACER
PLATES IN ELECTRODE ASSEMBLIES
Filed Sept. 9, 1952
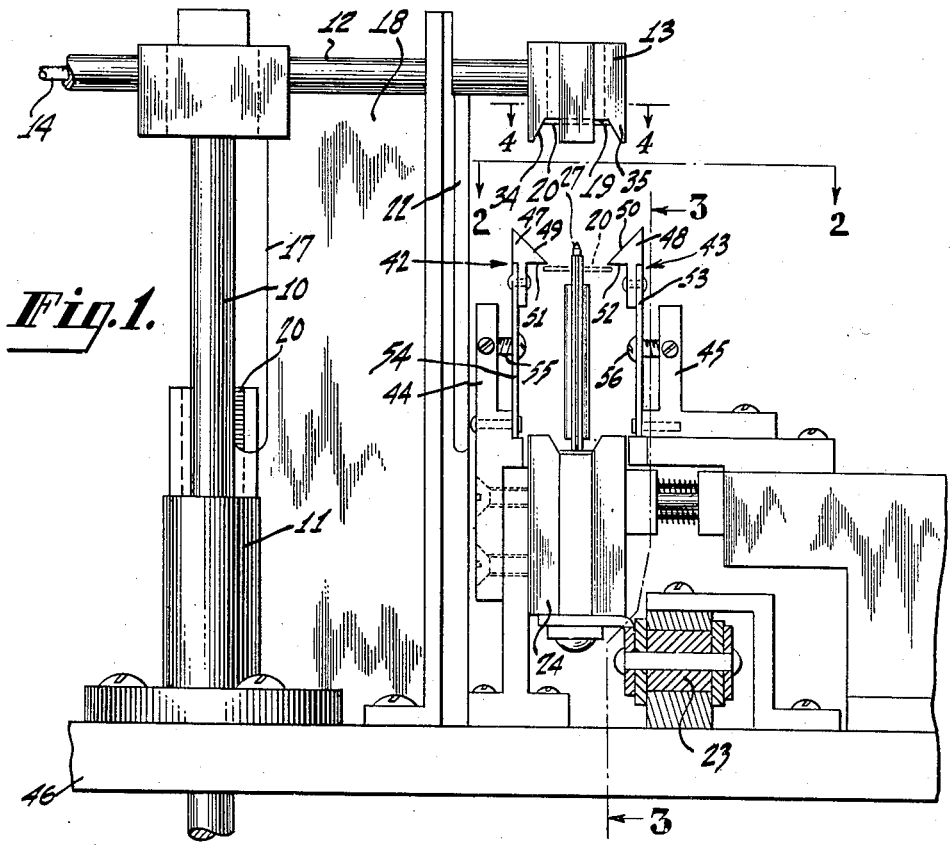
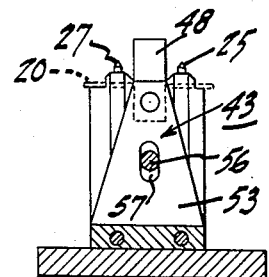
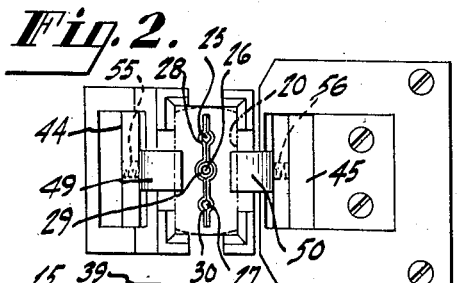
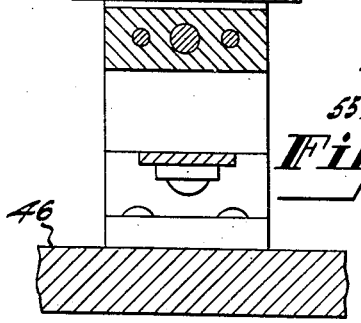
INVENTORS:
JOHN A. CHASE
FRANK J. PILAS &
ROY K. WOLKE
BY *William A. Zalesak*
ATTORNEY United States Patent Office 2,831,238
Patented Apr. 22, 1958

2,831,238

APPARATUS FOR AUTOMATICALLY MOUNTING SPACER PLATES IN ELECTRODE ASSEMBLIES

John Anthony Chase, Nutley, Frank John Pilas, Kearny, and Roy Karel Wolke, Maplewood, N. J., assignors to Radio Corporation of America, a corporation of Delaware Application September 9, 1952, Serial No. 308,668

1 Claim. (Cl. 29—25.19)

This invention relates to a mounting apparatus for automatically mounting electron tube parts to form an electrode cage assembly, and more particularly to a stripping mechanism for stripping a flat spacer plate forming one of said parts, from a loading device of the apparatus, after the plate has been carried by the device to a desired position.

In copending application of Battstone et al., Serial No. 218,838, filed April 2, 1951, and assigned to the same assignee as the present invention, there is described an apparatus for automatically loading on a mounting jig electron tube parts, including two spacer plates, made for example of mica, to form an electrode assembly. The apparatus includes a loading device having a flat surface in which terminate in the form of openings one or more passageways communicating with a source of reduced air pressure. The loading device is movable to dispose said flat surface thereof over and in face contact with a spacer plate in a reservoir of such plates. Such movement of the loading device causes the body of the plate to cover and close said openings and to produce a suction effect that urges the plate into contact with said surface. With the plate so urged against said surface thereof, the loading device is caused to move to a position for delivering the plate to a support or jig of the apparatus which is constructed to receive and support electron tube parts fed successively thereto. When the plate reaches a delivered position on the jig, communication of the passageways in the loading device with the source of low air pressure, is closed, and the plate is freed of the only deliberate retaining means provided for holding it on the loading device.

However, this breaking of the only deliberate retaining engagement between the plate and loading device, does not always assure release of a plate by the loading device. This is because the engaged surface of the plate and the engaging surface of the loading device are flat and when in face contacting relation, produce an independent suction effect. This independent suction effect is sufficiently strong in some instances to prevent release of the plate by the loading device. In addition, edge engagements of the spacer plate by the loading device may involve frictional forces of such magnitude as to prevent release of the plate at the end of a loading operation. Since the loading device referred to is but one of many such devices in the automatic mounting apparatus aforementioned which is designed to successively load electrode cage parts in a predetermined arrangement, it will be obvious that failure of the instant loading device to load and release a plate will seriously effect the arrangement mentioned and render impossible the build-up of a desired electrode cage by the other loading devices of the mounting apparatus aforementioned.

An electrode cage mounted by the apparatus referred to usually includes an upper and a lower insulating plate. In practice, the first element loaded by the apparatus is a spacer plate of the type discussed. If a loading failure should occur with respect to such first loaded element, as by failure to release the suctional or frictional engagement between the plate and the loader on completion of a loading operation, a subsequent mounting of other elements supplementary to the plate to form a cage will result in a useless structure due to the absence of the plate referred to.

The final element loaded is a second spacer plate, the loading of which is accompanied by a force sufficient to cause electrode elements to become locked into engagement with both spacer plates. In the event of an unreleased substantial suctional or frictional engagement between the second spacer plate and the loader, it is likely the entire electrode cage completed by said second plate, will be carried away from its assigned position by the loader, and may jam the entire mounting apparatus.

It is thus apparent from the foregoing that a serious problem is presented in connection with a mounting apparatus of the type described in the aforementioned copending application. Thus, where the loader fails to release a plate at the end of a loading operation, it may entail either an incomplete cage, or entail damage to the cage being mounted as well as serious jamming of the entire mounting apparatus.

Accordingly, it is the object of the invention to provide a mounting apparatus having means for overcoming the foregoing problem.

Another aim of the invention is to provide positive means at plate loading stations of an automatic mounting apparatus, for releasing a plate from a plate loader after a plate loading operation has been completed.

A further purpose of the invention is to provide at each plate loading position of the apparatus, a stripping mechanism for mechanically engaging a plate being loaded and preventing the plate from following a loader retracting from a loading position.

Another object is to provide a mounting apparatus having a movable loader at a loading location thereof engaging one face of a spacer plate during a loading operation and a fixed stripper for engaging a portion of said face for mechanically stripping the plate from the loader on retraction of the loader at the end of a loading operation.

A further aim of the invention is to provide a novel arrangement of a loading head and stripper permitting simultaneous engagement of a spacer plate by both the loading head and the stripper and utilizing the retractive movement of the loading head after completion of a loading operation, for releasing the spacer plate from the loading head.

Another purpose is to provide at a spacer plate loading location resiliently mounted stripping members disposed in the path of a plate loader and adapted to separate in response to the movement of a plate being loaded and to engage a loader-engaged and trailing surface of the plate for locking said plate against a retracting force exerted by the loader thereon.

According to one feature of the invention, a pair of spring mounted fingers are disposed on opposite sides of a path followed by a loader and a spacer plate carried by the loader. The spacer plate is held by the loader in such a manner that it extends transversely of the path referred to, and is disposed at the leading end of the loader. The path referred to terminates at a location defining the position of a properly loaded plate for forming the electrode cage aforementioned. The fingers referred to are positioned in close proximity to said location, to prevent any objectionable retraction of a spacer plate delivered to this location.

Each of the fingers comprises a structure having a bevelled free end for movement away from the other finger, in response to engagement of a spacer plate carried by the loader aforementioned to said loaded position.

The other end of the structure is fixed to a stationary portion of the associated mounting apparatus. Intermediate its ends, the structure constitutes a relatively thin and flat shank of spring-like or flexible material, such as steel, which permits the free end movement referred to. The free end portion of each finger includes an undercut portion having a surface disposed in a plane parallel to the plane of a spacer plate carried by the loader.

The loader includes a head having opposite sides cut away to provide recesses into which the free ends of the fingers referred to may extend during a terminal portion of a loading operation, so as to permit their planar surfaces referred to, to engage the trailing surface of a spacer plate.

The combination of bevelled and planar surfaces at the free end portions of the fingers, and a flexible intermediate portion thereof as well as of a loading head having side portions cut away as indicated above, permits the fingers to engage and be flexed apart by a spacer plate being loaded to dispose the plate in engagement with the undercut planar surfaces referred to for opposing return travel of a loaded plate with a retracting loader.

Further objects and advantages of the invention will become clear from the following and more detailed consideration of the invention.

Referring now to the drawing,

Figure 1 shows an elevation partly in section of a loader for loading a flat spacer plate in appropriate position for forming an electrode cage, and a stripping mechanism according to the invention, for mechanically stripping a loaded plate from the loader;

Figure 2 is a top view along the line 2—2 of Figure 1;

Figure 3 shows a sectional elevation along the line 3—3 of Figure 1; and

Figure 4 is a view partly in cross-section along the line 4—4 of Figure 1.

Referring now to the drawing in more detail, there is shown in Figure 1 a loading station and a loading device that incorporate some of the features of the device described and shown in the copending application aforementioned. These features include a loader comprising a vertical shaft 10 mounted in sleeve 11 for rotary and axial movements and having affixed thereto near its upper end a tubular cross-member 12 carrying a pick-up head 13. A duct 14 extends axially through cross-member 12 and communicates with ducts 15, 16 extending through the pick-up head and terminating in openings in the lower or spacer engaging surface of said head.

The shaft 10 is moved axially and rotationally by suitable mechanism shown and described in said copending application. This mechanism first rotates the shaft referred to until the cross-member is in registry with slot 17 in guide plate 18, at which time the shaft is moved axially downward with cross-member 12 travelling in slot 17 until the spacer engaging surface 19 of the pick-up head contacts the upper spacer plate 20 contained in a reservoir 21 of spacer plates shown in dotted line in Figure 1. The reservoir referred to is positioned to be in vertical registry with the pick-up head when cross-member 12 is engaged by slot 17. When the spacer engaging surface of the pick-up head contacts the upper spacer plate referred to, a valve, not shown, is actuated to connect duct 14 with a source of low air pressure. This causes the openings in the pick-up head communicating with ducts 15, 16 thereon to produce a suction engagement between the upper spacer plate 20 and the spacer engaging surface 19 of the pick-up head.

After this engagement takes place, the shaft is raised by the mechanism referred to until cross-member 12 leaves slot 17. The shaft 10 is then rotated until the cross-member 12 establishes vertical registry with slot 22 in guide plate 18 which is parallel to but angularly spaced from slot 17.

When cross-member 12 is in vertical registry with slot 22 it is also in vertical registry with a loading location along an endless chain 23 shown in Figure 1 which is intermittently moved to dispose a jig 24 having mandrels 25, 26, 27 (Figure 2), momentarily in said location. Shaft 10 is then lowered by the mechanism aforementioned so that pick-up head 13 carrying a spacer plate 20 is lowered toward jig 24 and until the mandrels referred to enter apertures 28, 29, 30 in the spacer plate 20 (Figure 2) and openings 31, 32, 33 (Figure 4) provided in the pick-up head for this purpose.

Thereafter, in accordance with the apparatus described and shown in said copending application, the valve aforementioned is closed to stop the suction engagement of the pick-up head with the spacer plate carried thereby, for release of the spacer plate.

However, while closing the valve referred to, terminates the effectiveness of the only deliberate holding agency provided for causing the plate 20 to be held by the loading head 13 during a loading operation, it does not affect the unintentional holding agencies created when the spacer is engaged by the spacer engaging surface aforementioned of the pick-up head. This engagement involves both frictional and suctional forces.

The frictional force results from engagement of edge portions of the spacer plate by side walls 34 surrounding the spacer-engaging surface of the pick-up head. While these walls are spaced to reduce such frictional engagement to a minimum, they serve as orienting means for centering the spacer plate on the surface referred to and therefore are intended to engage the edges of the spacer plate. When the spacer plates dealt with fail to observe dimensional uniformity to close tolerances, the larger of such plates give rise to unavoidable frictional forces that may be effective to cause a spacer plate to adhere to the pick-up head and to follow the retractive movement thereof after a loading operation.

The suctional force between the spacer plate and the loading head that persists after the communication between the suction ducts 15, 16, in the loading head and the source of low air pressure aforementioned, is closed, is a force created by the relatively smooth planar surfaces of the loading head and the spacer plate engaged during a loading operation. This engagement closes the surfaces referred to, to air pressure, and their separation therefore requires a force in opposition to air pressure. In some cases, the weight of the spacer plate does not constitute an adequate force for effecting this separation.

To accomplish the desired separation of a spacer plate from the loading head aforementioned, at the end of a loading operation, there is provided according to the invention a loading head of novel construction and a stripping mechanism adapted to cooperate with said loading head for stripping a spacer plate carried by the loading head.

The novel loading head of the invention comprises a structure including a flat surface 19, for engaging a spacer plate, and bevelled projections 34, 35, 36, 37, 38 39 (Figures 1 and 4) for engaging edges of a spacer plate 20. As shown in Figure 4, the spaces 40, 41 defined by projections 35, 37 and 34, 36 extend inwardly of the loading head to provide side indentations in the spacer-engaging surface 19 of the head for a purpose to be described.

Cooperating with this loading head is a stripping mechanism comprising two oppositely disposed fingers 42, 43 fixed at one end to brackets 44, 45 respectively, mounted on stationary portion 46 of the mounting apparatus. At their other and free ends, the fingers referred to are provided with bevelled portions 47, 48 having inclined surfaces 49, 50 disposed roughly at 45° angles with respect to the vertical path through which a spacer plate is carried in a loading operation. The bevelled end portions of the fingers are also provided with undercut surfaces 51, 52. The intermediate portions 53, 54 of the fingers are made of flat and relatively springy material such as steel which has flexure serving to urge the fingers toward each other. To limit the flexure and control the minimum spacing between the fingers, adjustable screws 55, 56 fixed to brackets 44, 45, pass through slots in the intermediate portions of the fingers, one of such slots 57 being shown in Figure 3. The use of such slots prevent binding action between the fingers and screws referred to, during the various flexed positions assumed by the fingers in operation. It will be noted from Figure 1, that the screws referred to space the fingers so that the opposed edges of the bevelled portions 47, 48 are spaced slightly less than the width of spacer plate 20, for a purpose to be desribed.

As described in said copending application, jig 24 is intermittently movable to dispose the mandrels 25, 26, 27 momentarily in a stationary position in vertical registry with apertures 28, 29, 30 in the spacer plates. These apertures are also in registry with openings 31, 32, 33 in the loading head as aforementioned. The registries referred to permit a loading of the spacer plate on the mandrels mentioned.

The stripping fingers 42, 43 are mounted in critical relationship to the registered positions of the loading head 13 and the jig 24, and so as to dispose a portion of their inclined surfaces 47, 48 and undercut surfaces 51, 52 into the path of travel of a spacer plate carried downwardly by the loading head. The bevelled end portions 47, 48 of the stripping fingers extend equally into said path a relatively slight distance and no farther than the depth of the side indentations in the spacer engaging surface of the loading head referred to.

As will be noted by reference to Figure 4, the bevelled end portions 47, 48 of the stripping fingers have a width for extension into the spaces 40, 41 between side projections 35, 37, and 34, 36. This permits the loading head to freely pass the stripping fingers without contacting them.

The stripping fingers 42, 43 extend upwardly from the position assumed by jig 24 during a loading operation, so as to dispose the undercut surfaces 51, 52 of the fingers, below the upper ends of mandrels 25, 26, 27, as shown in Figure 1.

In describing the operation of the apparatus of the invention, it is assumed the loading head 13 has partly gone through a loading operation and is poised above a loading position with a spacer plate 20, as shown in Figure 1. It is also assumed that a jig 24 is momentarily in mounting position directly below the loading head referred to. When a loading operation is continued from these positions, it involves a downward movement of the loading head 13. This downward movement carries the leading end of the head and the spacer plate 20 carried thereby, past the bevelled head portions 47, 48 of the stripping fingers. The loading head, by virtue of its construction, as aforementioned, is free to pass said head portions without contacting them. However, the spacer plate 20 having side portions extending beyond the side extremities of the spacer-engaging surface of the loading head, will, to the extent of said side portions be in a path including a portion of said bevelled end portions of the spring fingers. Therefore, the downward travel of the loading head will cause side edges of the spacer plate to engage sloping surfaces 49, 50 of the fingers, thereby spreading the fingers apart. Further downward travel of the loading head will carry the spacer plate below the bevelled end portions thereof and permit the fingers to spring back to their normal positions. In consequence, the bevelled end portions mentioned are returned to their positions of partial extension into the path of travel of the spacer plate referred to.

When a spacer plate continues to cling to the loading head after a loading operation, it is therefore required to repass the bevelled end portions of the spring members, during a retractive movement of the loading head.

However, while passage of the spacer plate 20 between the bevelled end portions of the stripping fingers 42, 43 was facilitated during downward movement of the plate by the sloping surfaces 49, 50 of the fingers, upward movement of the spacer plate, once it has passed the bevelled end portions referred to, is prevented. This is because such upward movement causes portions of the spacer plate to engage the undercut surfaces 51, 52 on the bevelled end portions of the fingers which surfaces are parallel to the plane of the spacer plate. Therefore, pressure by the spacer plate against such undercut surfaces produces no component tending to separate the fingers, as a consequence of which the stripping fingers remain in their normal positions and lock the spacer plate in a position below said undercut surfaces. In this position, the spacer plate is in engagement with mandrels 25, 26, 27. This locking of the spacer plate in the position indicated is accomplished by a force greater than that with which the spacer plate clings to a retracting loading head, so that the retractive movement of the loading head causes the spacer plate to be stripped from said head in opposition to the non-deliberate frictional and suctional forces aforementioned that cause it to cling thereto.

It will be appreciated from the foregoing that a novel and advantageous apparatus for automatically mounting electron tube spacer plates in an electrode cage assembly has been provided. The apparatus includes a stripping mechanism characterized by simplicity and positive action and a spacer plate loading device having a structure for cooperative action with the stripping mechanism. Together, the loading device and the stripping mechanism assure the loading of a spacer plate by each loading operation and avoid the disadvantages aforementioned incidental to an undesired retraction by the loading device of a spacer plate once loaded into desired position.

What is claimed is:

In an apparatus for automatically assembling parts including a flat spacer plate having an aperture to form an electrode cage; a build-up tool movable to a loading position and having an elongated mandrel; a loading device having a planar surface for engaging a face of said plate and movable in a path to dispose said aperture in axial registry with said mandrel and towards said build-up tool to cause said mandrel to enter said aperture for loading said plate on said tool, said loading device having opposite recesses in said surface extending parallel to said surface for exposing portions of said face of said plate; and a stripping mechanism at said station for stripping said plate from said loading device after said plate is loaded on said tool, said mechanism comprising two oppositely disposed stripping members movable only in a plane normal to said path and into said recesses in response to movement of said loading device in said path, said mandrel having a length for receiving said plate and for providing a free end portion extending beyond said plate in loaded position, said free end portion extending through said plane, said stripping members having planar surfaces in said plane adapted to engage the exposed portions of said face of said plate when said stripping members are received in said recesses, said loading device being movable in said path away from said build-up tool, whereby said plate is adapted to be engaged by said stripping members when said device is moved away from said tool for stripping said plate from said device while preserving a loaded position of said plate on said tool.

References Cited in the file of this patent
UNITED STATES PATENTS

| | | |
|---|---|---|
| 2,155,958 | Schmidt | Apr. 25, 1939 |
| 2,352,926 | Weiss | July 4, 1944 |